Sept. 20, 1971  G. W. VOLAND  3,605,679

TIRE PRESSURE WARNING DEVICE

Filed Sept. 30, 1969  2 Sheets-Sheet 1

INVENTOR
George W. Voland
BY
Hofgren, Wegner, Allen, Stellman & McCord
ATTORNEYS

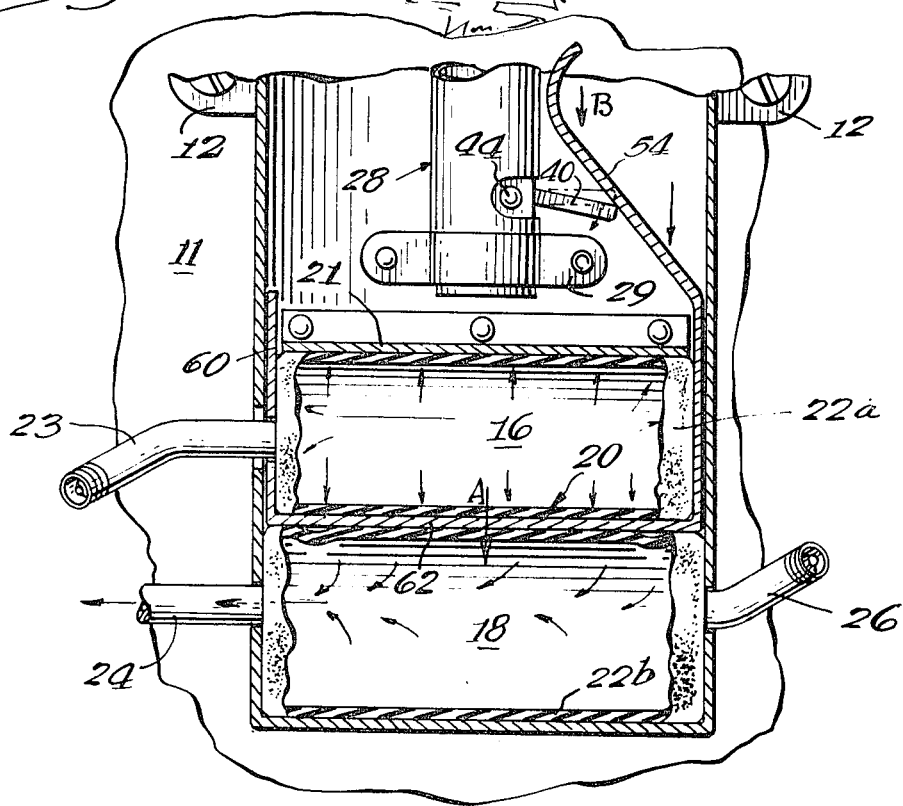
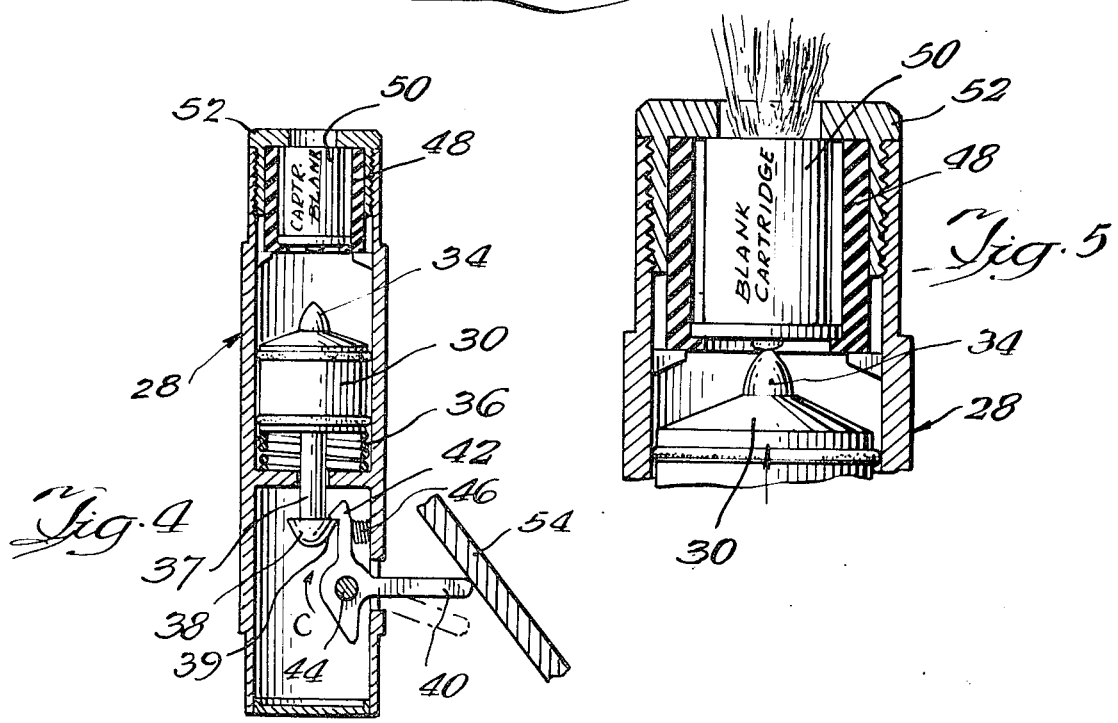

United States Patent Office 3,605,679
Patented Sept. 20, 1971

3,605,679
TIRE PRESSURE WARNING DEVICE
George W. Voland, 1035 Gomo Court,
Peoria, Ill. 61605
Filed Sept. 30, 1969, Ser. No. 862,432
Int. Cl. B60c 23/02
U.S. Cl. 116—34   7 Claims

ABSTRACT OF THE DISCLOSURE

A tire pressure warning device which includes an enclosure having a movable wall dividing the interior thereof into first and second chambers. An actuator is operatively connected to the wall for movement in response to movement of the wall to actuate the warning device which, preferably, comprises a blank cartridge which is fired. Fluid pressure is admitted to the first chamber at a given pressure corresponding to the desired tire pressure so that the given pressure acts against one side of the movable wall. The second chamber is maintained in fluid communication with the interior of the tire so that the actual tire pressure acts on the other side of the movable wall whereby a change in the actual tire pressure moves the wall to thereby move the actuator to actuate the warning device. The pressure in the first chamber may be varied or preset to equalize the actual tire pressure in the second chamber when the tire is properly inflated to accommodate various sizes and types of tires having various operating pressures.

SUMMARY OF THE INVENTION

This invention relates to a new and improved tire pressure warning device.

An object of the invention is to provide a new and improved warning device attachable to the wheel or rim of a tire and includes means for giving an audible signal when the air pressure in the tire falls below a predetermined amount.

Another object of the invention is to provide a new and improved tire pressure signal of an audible nature adapted to be sounded by a blow, and means for causing the blow to be struck when the tire pressure falls below a predetermined amount.

In carrying out the objects of the invention, the tire pressure warning device includes a frame or housing capable of mounting on the wheel or rim of the tire, a sealed enclosure mounted on the frame, a blank cartridge receiving socket on the frame, and a spring loaded firing mechanism adjacent the socket to strike a blow against a blank cartridge to fire the same. The enclosure has movable wall means dividing the interior thereof into first and second chambers. An actuating means is operatively connected to the movable wall means for movement in response to movement of the wall means to actuate the warning device by firing the blank cartridge. Means are provided permitting presetting of the fluid pressure in the first chamber to a given pressure corresponding to the desired tire pressure, with the given pressure acting against one side of the movable wall means. Means are provided establishing fluid communication between the second chamber and the interior of the tire so that actual tire pressure acts on the other side of the movable wall means whereby a change in the actual tire pressure moves the wall means to move the actuating means to fire the blank cartridge. The actuating means comprises an arm portion on the exterior of the enclosure and operatively connected to the movable wall means whereby the arm triggers the firing mechanism when the tire pressure falls below the pressure in the first chamber whereby the firing mechanism strikes a blow to the blank cartridge to give an audible signal.

Other objects, advantages and features of the invention will become apparent from the following detailed description taken in connection with the accompanying drawings.

DESCRIPTION OF THE DRAWINGS

FIG. 3 is a partial section similar to that of FIG. 2, with the respective parts in position when the tire pressure falls below a predetermined amount, for actuating the device;

FIG. 4 is a vertical section, on a further enlarged scale, through the firing chamber of the warning device; and FIG. 5 is a partial section similar to that of FIG. 4, on yet a further enlarged scale, showing the firing pin striking the blank cartridge.

DETAILED DESCRIPTION OF THE INVENTION

Figure 1:
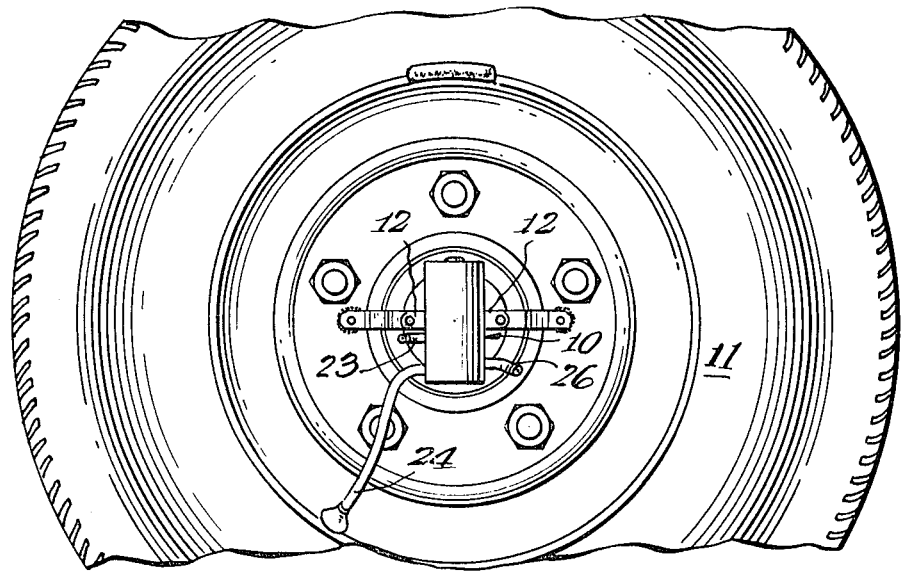
FIG. 1 is a partial side elevational view of a vehicle tire having the warning device of the present invention mounted thereon.

Referring to the drawings in greater detail, the tire pressure warning device of the present invention includes a frame in the form of a generally hollow housing, generally designated 10, which is adapted to be bolted to a tire wheel or rim 11 by means of a pair of outwardly extending ear portions 12. Within the housing 10 at the lower end thereof is defined an enclosure, generally designated 14, which is divided into first and second chambers 16 and 18, respectively, by a flexible, movable wall, generally designated 20, therebetween. The enclosure 14 actually is defined by a fixed plate 21 within the housing 10 and the lower end of the housing, and the chambers 16 and 18 are defined by a pair of bladders 22a and 22b, respectively, confined between the plate 21 and the lower end of the housing.

A valve stem 23, is provided on the bladder 22a whereby the first chamber 16 may be preset to a desired pressure depending on the size or type of tire to which the warning device is connected, with that preset pressure acting on the upper side of the movable wall 20, as seen in the drawings. The movable wall 20 is defined by the adjacent walls of the bladders 22a, 22b. An outlet 24 from the second or lower chamber 18 maintains the chamber 18 in fluid communication with the interior of the tire so that the actual tire pressure acts on the bottom side of the flexible wall 20 whereby a change in the actual tire pressure moves the wall means because of the fixed pressure in chamber 16. In other words, should the air pressure in the tire fall below the predetermined preset amount, the wall 20 will move in the direction of arrow A (FIG. 3), because of the expansion of chamber 16, and will cause actuation of the warning device, as set forth in greater detail hereinafter. The pressure in the first or upper chamber 16 may be varied or preset to equalize the actual tire pressure in the second or lower chamber 18 when the tire is properly inflated to accommodate various sizes or types of tires having various operating pressures.

A valve stem 26 is provided on the bladder 22b for inflating or deflating the tire, through the second chamber 18.

A firing chamber, generally designated 28, is mounted by means of brackets 29 within the upper portion of housing 10. A spring loaded firing mechanism, which includes a firing plunger 30 (FIG. 4) having a firing pin 34, is constrained within firing chamber 28 and is biased upwardly by a coil spring 36. The firing plunger 30 has a depending rod portion 37 which terminates in a head portion 38 having a cam surface 39. A trigger 40, having a hook portion 42, is pivotally mounted on the firing chamber 28 on a pivot pin 44. The hook portion 42 seats behind the firing plunger head 38 and is biased to such a cocked position by a spring 46. A blank cartridge receiving socket 48 is defined at the top of the firing chamber 28 for receiving a blank cartridge 50. The socket has a removable cap portion 52 for replacing fired cartridges.

Figure 2:
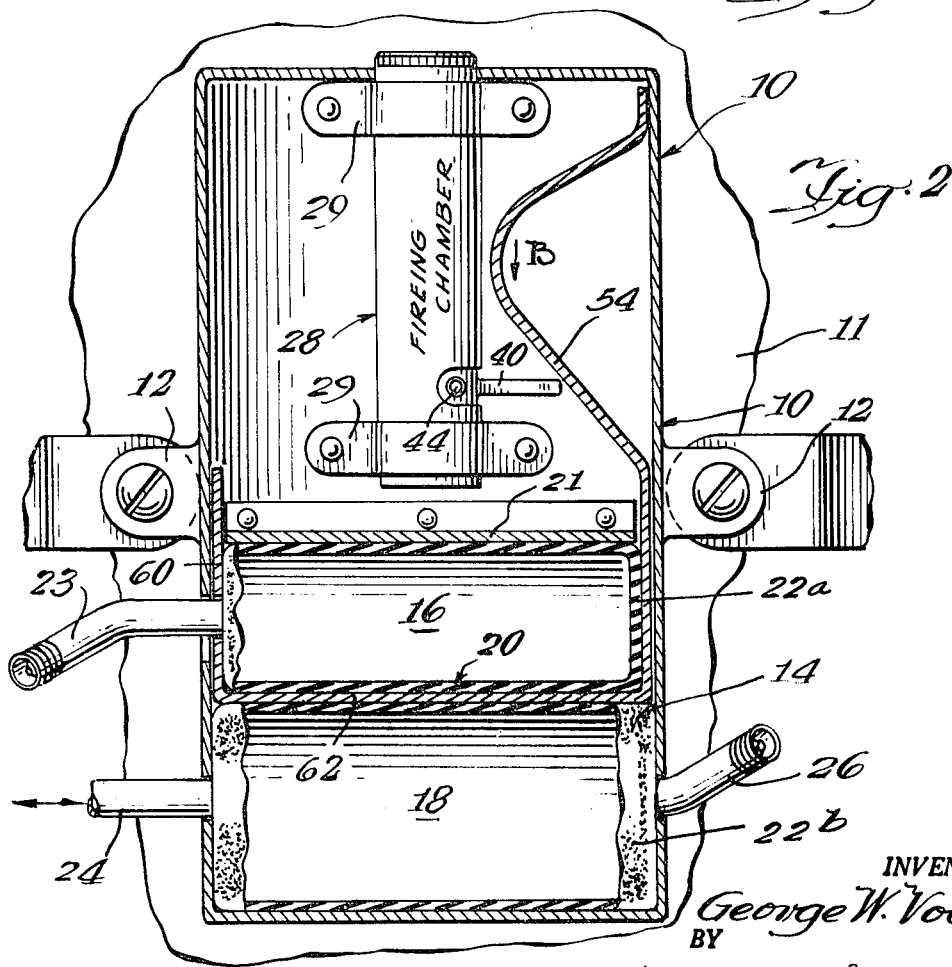
FIG. 2 is a vertical section, on an enlarged scale, through the warning device of the present invention, with the respective parts in position when the desired tire pressure is maintained.

An actuating means in the form of a bent arm member 54 (FIGS. 2 and 3) is operatively connected to the movable flexible wall 20 whereby movement of the wall by the expansion of chamber 16 in the direction of arrow A (FIG. 3), caused by a reduction in actual tire pressure, will cause the actuating arm 54 to move downwardly in the direction of arrow B (FIGS. 2 and 3) and engage the trigger 40 as shown in FIGS. 3 and 4. The arm 54 will pivot the trigger about pin 44 in the direction of arrow C (FIG. 4) and release the firing plunger 30, whereupon the energy stored in the coil spring 36 is released and causes the firing pin 34 to be biased upwardly to strike a blow against the blank cartridge to fire the cartridge and give an audible warning signal. The means for connecting the actuating arm 54 to the wall 20 for movement in response to movement of the wall comprises a cup shaped bucket portion 60 within which is disposed the bladder 22a and which has a wall portion 62 sandwiched between the bladders 22a, 22b.

The firing plunger is reset to a cocked position by moving the plunger downwardly against the biasing of spring 36 until the head portion 38 seats behind the hook portion 42 of the trigger 40 as shown in FIG. 4. The cam surface 39 on the firing plunger head 38 will move the hook portion out of the path of movement of the head portion for seating therebehind under the biasing of spring 46.

The foregoing detailed description has been given for clearness of understanding only and no unnecessary limitations should be understood therefrom as some modifications will be obvious to those skilled in the art.

I claim:

1. A tire pressure warning device, comprising: an enclosure; movable wall means dividing the interior of said enclosure into first and second independent fluid pressure chambers, there being no fluid communication between the chambers; an actuating means operatively connected to the wall means for movement in response to movement of said wall means to actuate said warning device; means permitting the fluid pressure in said first fluid chamber to be preset to a given pressure corresponding to a desired tire pressure, said given pressure acting against one side of said movable wall means; and means establishing fluid communication between said second fluid chamber and the interior of the tire so that actual tire pressure acts on the other side of said movable wall means whereby a change in said actual tire pressure moves said wall means to move said actuating means to actuate the warning device.

2. The warning device of claim 1 wherein the fluid pressure in said first chamber may be preset to any desired given pressure to accommodate various sizes and types of tires.

3. A tire pressure warning device, comprising: an enclosure; movable wall means dividing the interior of said enclosure into first and second chambers; a frame; means mounting a blank cartridge on said frame; a firing mechanism mounted on the frame for firing the blank cartridge; an actuating means operatively connected to the wall means for movement in response to movement of said wall means to actuate said firing mechanism; means permitting the fluid pressure in said first chamber to be preset to a given pressure corresponding to a desired tire pressure, said given pressure acting against one side of said movable wall means; and means establishing fluid communication between said second chamber and the interior of the tire so that the actual tire pressure acts on the other side of said movable wall means whereby a change in said actual tire pressure moves said wall means to move said actuating means to actuate the firing mechanism.

4. The warning device of claim 3 wherein said frame is adapted for mounting on the wheel of a tire, said enclosure, actuating means, blank cartridge and firing mechanism all being mounted on said frame.

5. The warning device of claim 4 wherein at least a portion of said actuating means is exposed externally of said enclosure for engaging and actuating said firing mechanism.

6. A tire pressure warning device, comprising: an enclosure, first and second flexible bladder members confined within said enclosure with adjacent wall portions defining movable wall means, an actuating means including a first portion sandwiched between said bladder wall portions for movement therewith on expansion and contraction thereof and a second portion rigidly connected to said first portion for movement therewith, said second portion of said actuating means extending exteriorly of said enclosure for actuating said warning device, means permitting the fluid in said first bladder member to be preset to a given pressure corresponding to a desired tire pressure, and means establishing fluid communication between said second bladder member and the interior of the tire whereby a change in said actual tire pressure moves said adjacent wall portions and the actuating means sandwiched therebetween to actuate the warning device.

7. A self-contained tire pressure warning device, comprising: a frame adapted for mounting on the wheel of a tire, means mounting a blank cartridge on said frame, a firing mechanism mounted on said frame for firing the blank cartridge, a pressure responsive actuating means on said frame to actuate said firing mechanism and including first and second independent pressure responsive portions, means establishing fluid communication between the first portion of said actuating means and the interior of the tire so that the actual tire pressure acts on said first portion whereby a drop in said actual tire pressure actuates the actuating means to actuate the firing mechanism, and the second portion of said pressure responsive actuating means being independent of the actual tire pressure on said first portion and comprising an adjustable pressure reference means counteracting the first portion of said actuating means whereby said second portion of the actuating means may be preset to a given pressure corresponding to a desired tire pressure to thereby equalize the tire pressure on said first portion of the actuating means when the tire is properly inflated, to accommodate various sizes and types of tires having varying operating pressures.

References Cited

UNITED STATES PATENTS

| | | | |
|---|---|---|---|
| 1,173,038 | 2/1916 | Roschanek | 73—407 |
| 1,281,274 | 10/1918 | Berry | 116—34 |
| 1,368,927 | 2/1921 | Harris | 116—34 |
| 1,673,883 | 6/1928 | Potestio | 116—34 |
| 2,260,246 | 10/1941 | Woodruff et al. | 137—156 |
| 2,319,011 | 5/1943 | Meredith | 73—408X |
| 2,620,762 | 12/1952 | Benz | 116—34 |
| 3,129,690 | 4/1964 | Nygard | 116—34 |

LOUIS J. CAPOZI, Primary Examiner

U.S. Cl. X.R.

73—146.8; 116—105; 137—227